Figure 2:
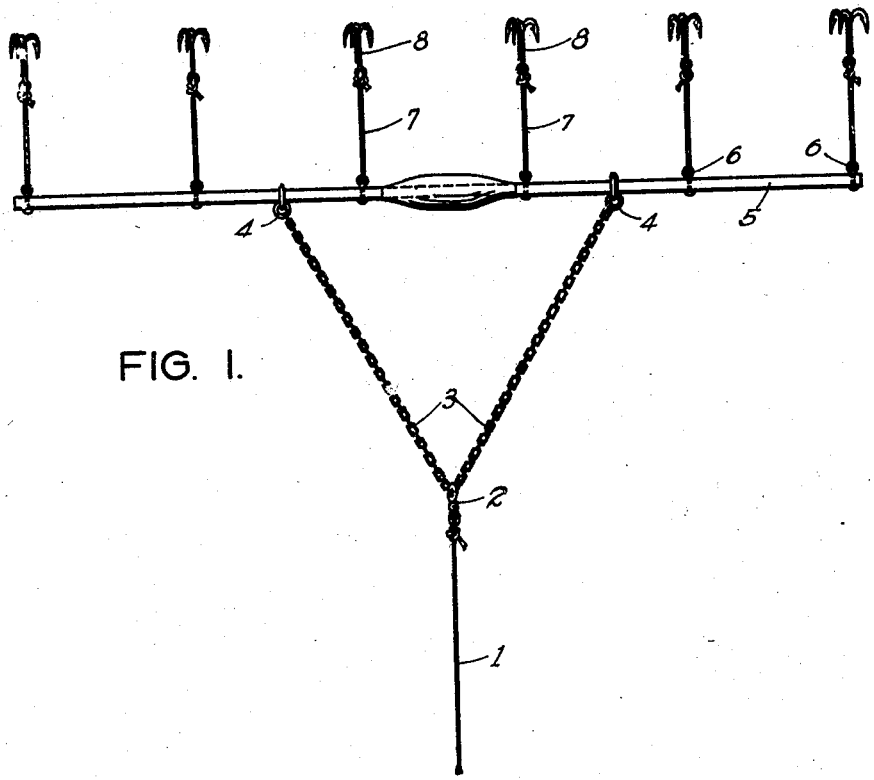

April 8, 1930.  G. R. McALPINE  1,753,468
DRAG FOR RECOVERING DEAD BODIES AND THE LIKE
Filed Sept. 19, 1927

FIG. I.

George R. McAlpine
INVENTOR.
BY Loyal J. Miller
ATTORNEYS.

Patented Apr. 8, 1930

1,753,468

UNITED STATES PATENT OFFICE

GEORGE R. McALPINE, OF OKLAHOMA CITY, OKLAHOMA

DRAG FOR RECOVERING DEAD BODIES AND THE LIKE

Application filed September 19, 1927. Serial No. 220,378.

This invention relates to new and useful improvements in devices for recovering the bodies of persons who have drowned, and pertains more particularly to devices of this character which is light and easily transported.

The primary objects of the invention are to provide a device of this character which is new, novel, efficient and of evident utility; which will sink instantly when placed in the water; and remain sunk until forcibly withdrawn from the water; which is adapted to be used in flowing streams, or still bodies of water on any kind of bottom; which is adapted to be turned in any direction on the swivel; to provide hooks and leaders or strands therefrom to the central body which are of sufficient strength to raise any body caught thereon but are of such strength as to permit of the individual strands breaking before extremely heavy objects on which they catch will cause the device itself to break; to provide a device wherein the individual leaders to the various hooks can be easily and cheaply replaced; which may be worked manually from the banks, or from boats, or otherwise drawn; and finally to provide a device of this character which is simple, inexpensive in construction and manufacture and easy of operation.

Other objects of the invention will more fully appear from the specification, claim and accompanying one-sheet drawing of which Figure 1 is a plan view of the drag showing the completely assembled device; and Fig. 2 is an enlarged fragmentary view showing one of the hooks and its connections.

Like characters of reference designate like parts in all the figures.

While the figures used herein to illustrate the device feature the preferred embodiment of my invention, it is to be understood that slight minor changes in the arrangements and proportions of the constituent parts will in no way violate the spirit of my invention.

Referring more particularly to the drawings, the device comprises a steel cable or dragline 1 for attaching to a boat, or for being handled manually, or by an engine. This cable is to be of sufficient strength to pull the drag out of the water and to break the various individual leaders between the hooks and the main body of the drag thereby saving the main part of the drag from being lost; the chain swivel 2 for uniting the cable 1 and the chains 3 leading from the swivel 2 to the cable 1, being preferably of the class of chains known as windmill chains; the said swivel 2 permitting the said cable 1 to turn or rotate without kinking or disarranging the chains 3. The chains 3 are attached to the central supporting body 5 by the connections 4. Spaced at uniform intervals along the said body 5 are the eye-bolts or clasps securely fastened in place, the said eye-bolts 6 or clasps serve as supports for the attachment of the leaders 7 which may be made of cotton cord or any other suitable material, but of sufficient strength to raise any human body, or the like. On the ends of the leaders 7 are fastened the triple hooks 8, the three points and barbs being equally spaced with reference to the shank 9. This arrangement of the hooks 8 always leaves one in an upright position when being dragged regardless of how it may be turned as shown in Fig. 2. The central supporting body 5 is preferably hollow and its ends open thus facilitating the sinking of the device as soon as it is placed in the water. To further assist in sinking the drag I provide a weight 10 preferably around the center of the body 5. This concentration of weight in the position shown adds strength to the main body 5 and brings the center of gravity of the whole device in the line of force exerted by the dragline 1 and tends to balance hooks 8 and their leaders 7 as if on an axis. The hooks and the leaders 7 must have sufficient strength to hold and raise any drowned body or the like that may be caught but should the drag hooks 8 catch on any other object such as a log, root, stump, ledge or stone, the drag line 1, the swivel 2, the chains 3, connections 4, body 5 and the eye-bolts or clasps 6 are all stronger than any individual leader or hook, or than all of them combined, so that if one or more should become entangled with any objects not movable by ordinary force, the hook or leader will break without endangering the breaking or losing of the whole drag.

Any hook or leader thus broken can be easily and cheaply replaced.

In using my improved drag, the cable or drag-line 1 is of sufficient length so that when attached to a suitable boat engine, or be manually dragged, the supporting body 5 will be drawn along the bottom of the stream or body of water, the hooks 8 will comb, as it were, a strip of bottom equal to the length of the body 5 and any body lying in the path of the drag cannot fail to be caught. In unfailingly successful use it has been found that the leaders and hooks are preferably about one foot apart and the leaders approximately one foot in length, the best practical length of body is preferably five or six feet. This permits of its more easy and more speedy handling and produces better results. It is preferred to use more than one drag rather than make them of greater length. It has never failed in recovering the body of a drowned person when it was known that the body was in the stream or water being dragged for it. While specific dimensions have been given in this description, it is to be understood that my invention is not to be confined to those dimensions alone.

From the description, specification, claims and drawing, the advantages of my invention will be apparent to those skilled in the art to which my invention pertains. I have entered into a detailed description of the construction and relative arrangement of the parts embraced in the present embodiment of the invention in order to impart a full, clear, and exact understanding of said embodiment. I do not desire, however, to be understood as confining myself to the specific construction and relative arrangement of parts, inasmuch as in the future practice of the invention various changes and modifications may be made such as fall within the scope of my invention without departing from the principle thereof, or sacrificing any of its advantages.

Having thus described my invention what is claimed and desired to be secured by Letters Patent is:

A drag for recovering dead bodies, and the like, as described, comprising a metallic longitudinal tubular body having open ends, and having holding members suitably positioned thereon for balancing the draft on said body while in operation and for attaching drawing means thereto, a flexible metallic drawing member having its ends fastened to said holding means for drawing said longitudinal body, a swivel centrally disposed on said drawing member, cable means connecting said swivel and adapted for pulling said device, said swivel adapted for adjustably positioning said cable and said drawing member in varying suitable relationships, a plurality of tri-pointed barbed grabbing hooks each having a shank thereon, a plurality of pliant leaders each fastened at one end by eye-bolt holding means to said longitudinal body in spaced relation, and at the other end to a shank of one of the said tri-pointed barbed grabbing hooks, and a heavy weighting means centrally positioned on said longitudinal body for weighting said body in swift currents and for equalizing the two ends of said longitudinal body in active operation.

GEORGE R. McALPINE.